United States Patent [19]
Popat

[11] Patent Number: 5,853,837
[45] Date of Patent: Dec. 29, 1998

[54] LASER OR INK JET PRINTABLE BUSINESS CARD SYSTEM

[75] Inventor: Ghanshyam H. Popat, Alta Loma, Calif.

[73] Assignee: Avery Dennison Corporation, Pasadena, Calif.

[21] Appl. No.: 764,713

[22] Filed: Dec. 10, 1996

Related U.S. Application Data

[62] Division of Ser. No. 641,332, Apr. 30, 1996.

[51] Int. Cl.⁶ ........................................................ B32B 3/00
[52] U.S. Cl. ............................ 428/43; 428/77; 428/131; 428/138; 283/105
[58] Field of Search ................................. 428/43, 77, 78, 428/79, 81, 131, 138, 192; 283/105

[56] References Cited

U.S. PATENT DOCUMENTS

| | | |
|---|---|---|
| 3,267,780 | 8/1966 | Roth . |
| 3,288,006 | 11/1966 | Erlandson . |
| 3,338,199 | 8/1967 | Taylor . |
| 3,790,744 | 2/1974 | Bowen . |
| 4,176,572 | 12/1979 | Pennington . |
| 4,457,199 | 7/1984 | Corcoran . |
| 4,494,435 | 1/1985 | Lindsay . |
| 4,524,894 | 6/1985 | Leblond . |
| 4,979,612 | 12/1990 | Melbye . |
| 5,132,915 | 7/1992 | Goodman . |
| 5,160,573 | 11/1992 | Takagi et al. . |
| 5,220,858 | 6/1993 | Allen et al. . |
| 5,238,269 | 8/1993 | Levine . |
| 5,398,580 | 3/1995 | Gerjardt et al. . |
| 5,571,587 | 11/1996 | Bishop et al. . |

FOREIGN PATENT DOCUMENTS

| | | |
|---|---|---|
| 0 377 289 | 12/1989 | European Pat. Off. . |
| O 688 006A1 | 3/1995 | European Pat. Off. . |
| 4240825A1 | 6/1994 | Germany . |
| WO 88/07737 | 10/1988 | WIPO . |
| WO 94/20944 | 9/1994 | WIPO . |

*Primary Examiner*—Elizabeth Evans
*Attorney, Agent, or Firm*—Oppenheimer Wolff & Donnelly LLP

[57] ABSTRACT

Two pairs of parallel substantial-cut or scored lines extend the length of a card stock sheet and short through-cut lines extend between each of the pairs to define two columns of business card blanks on the sheet. The sheet is passed through a laser or ink jet printer, printing the desired identifying or other indicia on the blanks. The blanks are then separated along the substantial-cut and through-cut lines and the waste sheet portions at the ends, sides, and between the columns are disposed of. The business cards separate cleanly along the substantial-cut lines, superior to the microperforated business card separation lines. Even with the substantial-cut and full-cut lines, the card stock sheets have enough integrity to reliably pass through the printer without breaking apart.

49 Claims, 2 Drawing Sheets

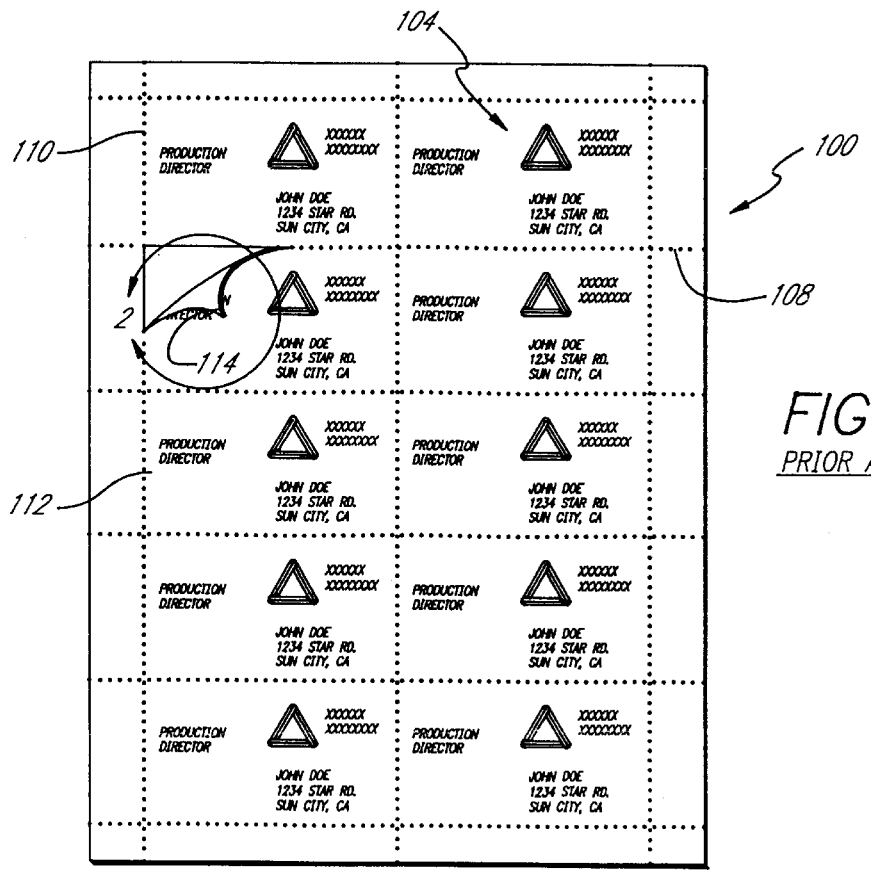
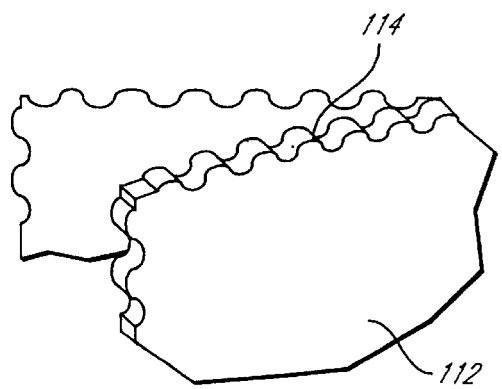
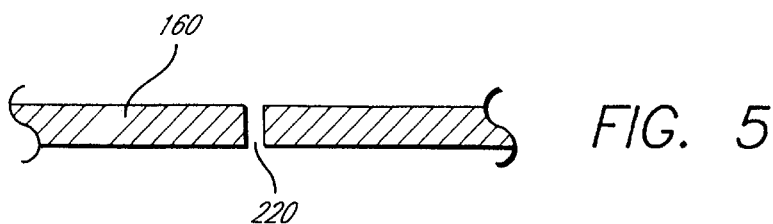
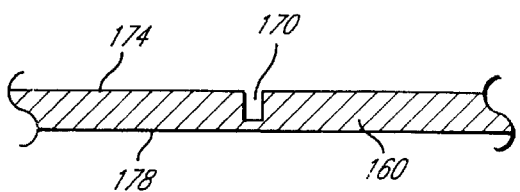

LASER OR INK JET PRINTABLE BUSINESS CARD SYSTEM

CROSS REFERENCE TO RELATED APPLICATION

This is a division of copending application Ser. No. 08/641,332, filed Apr. 30, 1996 pending.

BACKGROUND OF THE INVENTION

The present invention relates to methods of forming business cards and to the constructions of sheets of blank business cards for passing through laser or ink jet printers or copiers.

A sheet of business cards as known in the prior art is shown in FIG. 1 generally at 100. Sheet 100 is a drawing of the sheet after having passed through a laser or ink jet printer and with the desired indicia shown generally at 104 printed thereon. Sheet 100 was formed with a gridwork of horizontal and vertical microperforation lines 108, 110 extending the full length and width of the sheet. The microperforations are typically more than fly per inch. Although the microperforations are thereby small and close together, when the cards 112, after the printing operation thereon, are separated from one another by tearing along the lines, perfectly clean cuts or edges do not result. Rather, the edges 114 are slightly fuzzy as shown in the enlarged view of FIG. 2. These fuzzy edges 114 give the card 112 a less professional look than clean knife cut edges and in certain uses are unacceptable.

SUMMARY OF THE INVENTION

Directed to remedying the problems of the prior art, disclosed herein is an improved business card sheet assembly. The assembly includes a card stock sheet having two parallel pairs of substantial-cut lines extending the length of the sheet and engaging the sheet at both ends thereof. The substantial-cut lines extend about 90% through the thickness of the sheet from the front towards the back surface. The sheet is then die cut with short (through-cut) lines extending widthwise between the lines of each pair. The substantial-cut and through-cut lines form on the sheet two columns of business card blanks, with paper waste strips at the side (and end) margins and between the columns. The sheet is then passed through a laser or ink jet printer and the desired indicia printed on each of the blanks. The printed card blanks are separated from one another along the substantial-cut and through-cut lines. The borders or edges of the card are clean, superior to the prior art microperforated cards.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a front view of a sheet of business cards of the prior art, after having been printed, and showing one of them being torn away along its microperforation lines;

FIG. 2 is an enlarged view taken on circle 2 of FIG. 1;

FIG. 5 is an enlarged view taken on line 5—5 of FIG. 4; and

FIG. 6 is an enlarged view taken on line 6—6 of FIG. 4.

DETAILED DESCRIPTION OF PREFERRED EMBODIMENTS OF THE INVENTION

Figure 3:
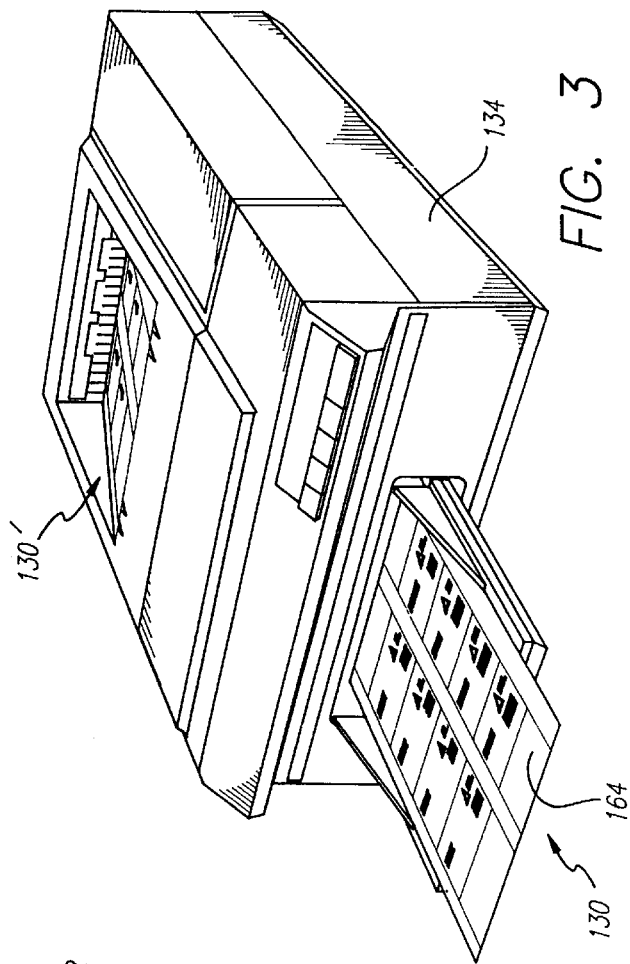
FIG. 3 is a perspective view showing sheet assemblies of the present invention passing through a printer.

Referring to FIGS. 3–6 a sheet assembly of the present invention is shown generally at 130. The sheet assembly 130 is shown at the bottom left of FIG. 3 before entering the printer 134 and as it would be purchased by the user (after removal from its packaging (not shown)). The sheet assembly 130' is shown in the upper right of FIG. 3 and (in isolation) in FIG. 4 after having passed through the printer 134, and with the identifying indicia shown generally at 140 printed thereon. As an example, the indicia 140 can include the individual's name 142, address 144, title 146, company name 148 and company logo 150. It can additionally or alternatively include other information such as telephone and facsimile numbers and/or E-mail addresses as desired. The printer 134 can be a laser or ink jet printer, or photocopier.

The sheet assembly includes a sheet of paper 160 such as the ten mil thick cardstock available from Simpson Paper Mill in Pomona, Calif. The thickness of the sheet of paper 160 is preferably between seven and twenty mils. A pattern of sheet portions or cards 164 are defined on the sheet by a pattern of lines. The sheet portions or cards 164 are preferably rectangular, but other shapes are within the scope of the invention. For example, the sheet 160 can be 8½×11 inches and each of the portions 164 can have the dimensions of a traditional business card (e.g., two by three and a half inches).

At least one of the defining lines is a "substantial-cut" or partial cut line 170, cut along its entire length, substantially but not all of the way through the paper 160; that is, cut from the top surface 174 of the paper approximately ninety percent the way through towards the bottom surface 178. This is shown in the enlarged view in FIG. 6. A preferred embodiment has the substantial-cut line(s) 170 extending 9.3 to 9.5 mil through a ten mil thick cardstock. Alternatively, they can extend between seventy and ninety-eight percent therethrough. The substantial-cut lines 170 can be formed by trimming wheels (rotary knives), by die cutting, laser scoring, or chemical or acid etching.

Figure 4:
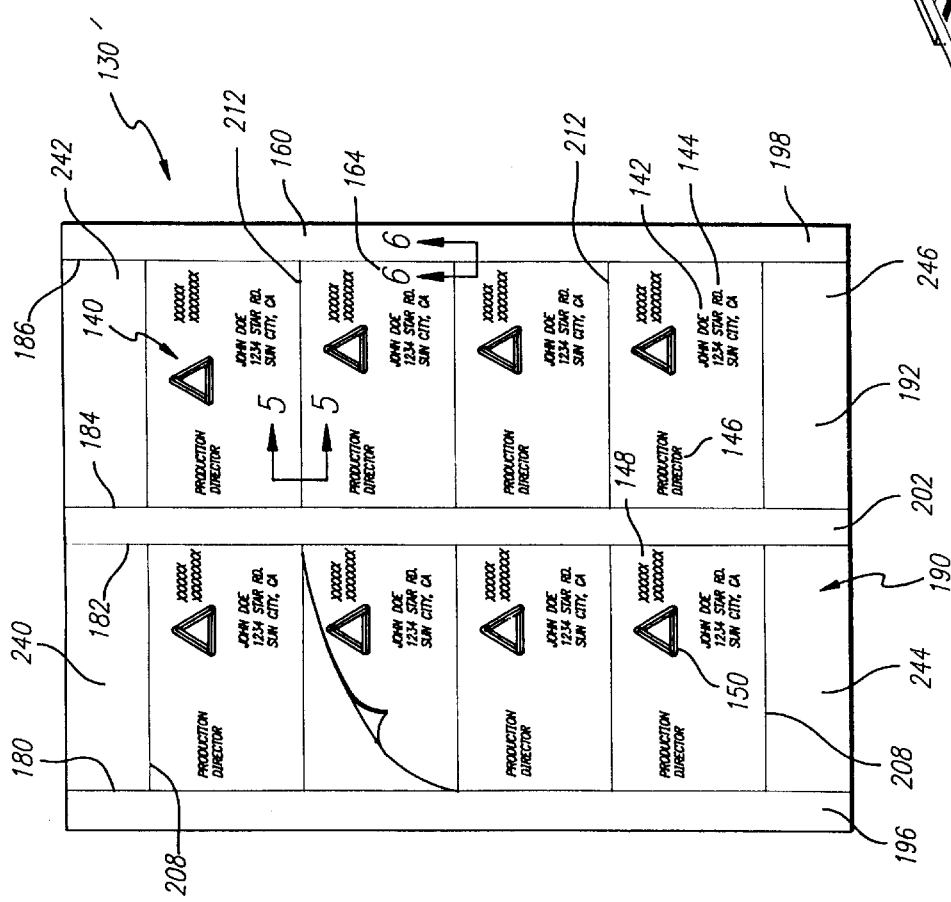
FIG. 4 is a front elevational view of one of the sheet assemblies of the present invention after a printing operation thereon.

A preferred pattern of defining lines is best shown in FIG. 4. It includes four parallel lengthwise lines 180, 182, 184, 186 extending the length of the sheet 160 and defining two parallel columns 190, 192 with waste strips 196, 198 at the outer edges and a center waste strip 202 between the columns. Spaced parallel widthwise lines 208, 212 extend the widths of the columns 190, 192, but not beyond them. As can be understood from FIG. 4, the lengthwise lines 180, 182, 184, 186 define the left and right edges of the sheet portions or cards 164 and the widthwise lines 208, 212 from the top and bottom edges thereof The lengthwise lines 180, 182, 184, 186 are each substantial-cut lines 170 as disclosed above. And the widthwise lines 208, 212 are preferably each through-cut lines formed by die cutting, as best shown in FIG. 5 at 220, extending the entire distance through the sheet 160 along their entire lengths; that is, between and engaging adjacent of the substantial-cut lengthwise lines. The through-cut lines 220 define a perfectly smooth edge and thus are preferred over microperforated or substantial-cut widthwise lines. They also do not require any separating effort. None of the through-cut lines 220 engages any edge of the sheet 160. If they did, the sheet 160 would be likely to be torn along the line. The pattern of substantial-cut and full-cut lines still provides the card stock sheet 160 with sufficient integrity to reliably pass through the printer 134 without breaking apart.

After the sheet assembly 130 has passed through the printer 134 and the desired indicia 140 printed thereon, the individual cards (or printed media) 164 are separated by tearing or pulling along the four substantial-cut lines. Of course, no further separation is required on the through-cut lines. The side and center waste strips 196, 198, 202 can then be disposed of, as can the end margin strips 240, 242, 244, 246 at the ends of both of the columns 190, 192.

From the foregoing detailed description, it will be evident that there are a number of changes, adaptations and modifications of the present invention which come within the province of those skilled in the art. For example, instead of paper the sheets can be laminated sheets, such as plastic and card stock, and instead of rectangular, the cards (or printed or printable media) can be triangular, circular or any other usable shape. However, it is intended that all such variations not departing from the spirit of the invention be considered as within the scope thereof as limited solely by the claims appended hereto.

What is claimed is:

1. A sheet assembly for passing through a printer or copier and separating out into individual printed cards, comprising:
   a sheet;
   first and second substantial-cut lines extending substantially the thickness of said sheet and extending the length or width of said sheet; and
   parallel and spaced weakened separation lines extending perpendicular to and between said substantial-cut lines on said sheet;
   wherein said separation lines and said substantial-cut lines define a column or row of card blanks; and
   wherein said sheet is adapted to be passed through a printer or copier and desired indicia printed on said card blanks, which can then be separated from one another along said separation lines and said substantial-cut lines.

2. The assembly of claim 1 wherein said sheet is a sheet of paper.

3. The assembly of claim 1 wherein said first and second substantial-cut lines are spaced parallel to one another.

4. The assembly of claim 3 wherein said substantial-cut lines extend the length of said sheet, and said separation lines and said substantial-cut lines define a column of card blanks.

5. The assembly of claim 4 wherein said separation lines comprise through-cut lines cut all of the way through said sheet and extending between and engaging at opposite ends thereof said first and second substantial-cut lines.

6. The assembly of claim 5 wherein end portions of said column of business card blanks engaging ends of said sheet define waste strips.

7. The assembly of claim 4 wherein said column of business card blanks defines a first column of business card blanks, and further comprising third and fourth substantial-cut lines in said sheet and additional separation lines extending therebetween and defining a second column of business card blanks, parallel to said first column.

8. The assembly of claim 7 further comprising a waste paper strip between said first and second columns and defined on opposite sides by said second and third substantial-cut lines.

9. The assembly of claim 4 wherein said sheet is 10 Mil thick cardstock.

10. The assembly of claim 9 wherein said substantial-cut lines are cut approximately 9.3 to 9.5 mils through said cardstock.

11. The assembly of claim 4 wherein said business card blanks comprise 2×3½ inch business card blanks, and said sheet is 8 ½×11 inches.

12. A sheet assembly for passing through a printer or copier and then separating out into at least one printed media, comprising:
   a sheet;
   at least one substantial-cut line extending substantially the thickness of said sheet; and
   at least one weakened separation line on said sheet;
   wherein said separation line and said substantial-cut line together define at least a substantial portion of a perimeter of at least one printable media; and
   wherein said sheet is adapted to be passed through a printer or copier and desired indicia printed on said printable media, which can then be easily and cleanly separated from said sheet along said separation line and said substantial-cut line to form individual printed media.

13. The assembly of claim 12 (wherein said individual printed media comprise a printed rectangular business card.

14. The assembly of claim 12 wherein said separation line comprises an elongate through-cut line cut all of the way through said sheet.

15. The assembly of claim 12 wherein said at least one substantial-cut line comprises two parallel substantial-cut lines and said at least one separation line comprises two parallel through-cut lines.

16. The assembly of claim 15 wherein said through-cut lines extend perpendicular to, between and engaging at opposite ends thereof said substantial-cut lines.

17. The assembly of claim 16 wherein said printable media comprise a rectangular business card blank.

18. The assembly of claim,12 said substantial-cut line extends between 70 and 98 percent of the thickness of said sheet.

19. A sheet assembly for passing through a printer or copier and separating out into individual printed cards, comprising:
   a sheet;
   first and second scored lines extending substantially the thickness of said sheet and extending the length or width of said sheet; and
   parallel and spaced through-cut lines extending perpendicular to and between said scored lines on said sheet;
   wherein said through-cut lines and said scored lines define a column or row of card blanks; and
   wherein said sheet comprises a single-sheet construction which is adapted without losing its integrity to be passed: without further structure attached thereto through a printer or copier and desired indicia printed on said card blanks, which can then be separated from one another along said scored lines and said through-cut lines.

20. The assembly of claim 19 wherein said sheet is a sheet of paper.

21. The assembly of claim 19 said first and second scored lines are spaced parallel to one another.

22. The assembly of claim 21 wherein said scored lines extend the length of said sheet, and said through-cut lines and said scored lines define a column of card blanks.

23. The assembly of claim 22 wherein said through-cut lines extend between and engage at opposite ends thereof said first and second scored lines.

24. The assembly of claim 23 wherein end portions of said column of business card blanks engaging ends of said sheet define waste strips.

25. The assembly of claim 22 wherein said column of business card blanks defines a first column of business card blanks, and further comprising third and fourth scored lines in said sheet and additional through-cut lines extending therebetween and defining a second column of business card blanks, parallel to said first column.

26. The assembly of claim 25 further comprising a waste paper strip between said first and second columns and defined on opposite sides by said second and third scored lines.

27. The assembly of claim 22 wherein said sheet is 10 mil thick cardstock.

28. The assembly of claim 27 wherein said substantial-cut lines arc cut approximately 9.3 to 9.5 mils through said cardstock.

29. The assembly of claim 22 wherein said business card blanks comprise 2×3 ½ inch business card blanks, and said sheet is 8 ½×11 inches.

30. A sheet assembly for passing through a printer or copier and then separating out into at least one printed media, comprising:
   a sheet;
   at least one scored line extending substantially the thickness of said sheet; and
   at least one elongate through-cut line on said sheet;
   wherein said scored line and said through-cut line together define at least a portion of a perimeter of at least one printable media; and
   wherein said sheet comprises a single-sheet construction which is adapted without losing its integrity to be passed, without further structure attached thereto, through a printer or copier and desired indicia printed on said printable media, which can then be easily and cleanly separated from said sheet along said scored line and said through-cut line to form individual printed media.

31. The assembly of claim 30 wherein said individual printed media comprise a printed rectangular business card.

32. The assembly of claim, 30 wherein said at least one scored line comprises two parallel scored lines and said at least one through-cut line comprises two parallel elongate through-cut lines.

33. The assembly of claim 32 wherein said through-cut lines extend perpendicular to, between and engaging at opposite ends thereof said scored lines.

34. The assembly of claim 33 wherein said printable media comprise a rectangular business card blank.

35. The assembly of claim 30 wherein said scored line extends between 70 and 98 percent of the thickness of said sheet.

36. A sheet assembly comprising:
   a single-sheet construction printable sheet;
   a plurality of separation lines formed on said sheet and dividing said sheet into a plurality of connected sheet portions; and
   at least some of said separation lines comprising substantial-cut lines extending through a substantial portion of a thickness of said sheet and thereby forming thin uncut intact sheet portions;
   wherein said sheet is adapted to be passed through a printer or copier and desired indicia printed on said sheet portions; and
   wherein said thin uncut intact sheet portions collectively comprise the sole means for keeping said sheet portions together while said sheet is passed through the printer or copier to maintain the integrity of said sheet until said sheet portions are subsequently separated along said separation lines to form a plurality of individual printed media.

37. The sheet assembly of claim 36 wherein said separation lines comprise weakened separation lines.

38. The sheet assembly of claim wherein at least some of said weakened separation lines comprise through-cut lines.

39. The sheet assembly of claim 36 wherein said substantial-cut lines extend between approximately 70 and 98 percent the way through said sheet.

40. The sheet assembly of claim 36 wherein said substantial-cut lines extend approximately 90 percent the way through said sheet.

41. The sheet assembly of claim wherein said substantial-cut lines extend approximately 93 to 95 percent the way through said sheet.

42. The sheet assembly of claim 36 wherein the individual printed media comprise printed rectangular business cards.

43. The sheet assembly of claim 36 wherein said substantial-cut lines include first and second substantial-cut lines extending the length or width of said sheet.

44. The sheet assembly of claim wherein said plurality of separation lines include parallel and spaced weakened separation lines extending perpendicular to and between said first and second substantial-cut lines.

45. The sheet assembly of claim 44 wherein said weakened separation lines comprise through-cut lines.

46. The sheet assembly of claim 36 wherein said sheet comprises 10 mil thick cardstock.

47. The sheet assembly of claim 36 wherein said sheet comprises an approximately 8–12 mil thick media sheet.

48. The sheet assembly of claim 36 wherein said intact uncut portions engage a back side of said sheet.

49. The sheet assembly of claim 36 wherein said substantial cut-lines are all on only one face of said sheet.

* * * * *